United States Patent
Andrade et al.

(10) Patent No.: US 10,595,508 B2
(45) Date of Patent: Mar. 24, 2020

(54) SYSTEM AND METHOD FOR INTEGRATING A TRACKING SYSTEM INTO A CATTLE MANAGEMENT SYSTEM

(71) Applicant: Robert Bosch Limitada, Campinas-SP (BR)

(72) Inventors: Ricardo Keigo de Sales Andrade, Campinas-SP (BR); Luíz Fernando Leite Ribeiro, Jr., Campinas-SP (BR); Gustavo Henrique Ferro dos Santos, Paulínia-SP (BR); Anderson Domeneguette Felippe, Campinas-SP (BR)

(73) Assignee: Robert Bosch Limitada, Campinas-SP (BR)

( * ) Notice: Subject to any disclaimer, the term of this patent is extended or adjusted under 35 U.S.C. 154(b) by 0 days.

(21) Appl. No.: 16/004,528

(22) Filed: Jun. 11, 2018

(65) Prior Publication Data

US 2018/0368361 A1    Dec. 27, 2018

(30) Foreign Application Priority Data

Jun. 27, 2017 (BR) ........................ BR102017013898

(51) Int. Cl.
| | |
|---|---|
| *A01K 11/00* | (2006.01) |
| *G06Q 50/02* | (2012.01) |
| *G06K 7/14* | (2006.01) |
| *G06Q 10/08* | (2012.01) |
| *G06K 7/10* | (2006.01) |

(52) U.S. Cl.
CPC .......... *A01K 11/004* (2013.01); *G06K 7/1413* (2013.01); *G06Q 10/087* (2013.01); *G06Q 50/02* (2013.01); *G06K 2007/10524* (2013.01)

(58) Field of Classification Search
CPC .................................................... G06K 7/1413
USPC ......................................................... 235/375
See application file for complete search history.

(56) References Cited

U.S. PATENT DOCUMENTS

| | | | |
|---|---|---|---|
| 2009/0055231 A1* | 2/2009 | Benza | G06Q 10/00 705/7.12 |
| 2010/0160809 A1* | 6/2010 | Laurence | A61B 5/01 600/549 |

(Continued)

*Primary Examiner* — Allyson N Trail
(74) *Attorney, Agent, or Firm* — Michael Best & Friedrich LLP

(57) ABSTRACT

The present invention refers to a system and method for integrating a tracking system, specifically the tracking system SisBov, into a cattle management system, particularly configured for beef cattle herd management, comprising a first reading device (1) which sends information to a processing center (2), the processing center (2) processing and sending the processed information to a recording device (3), the first reading device (1) reading a numeric code recorded on a first earring (10) and sending the information read to the processing center (2), the processing center (2) receiving the information read by the reading device (1) and processing and sending the information processed by the recording device (3), the recording device (3) recording the numerical code processed by the processing center (2), the same numerical code being preferably read by the first reading device (1), in a third earring (12), the system determining a unique numerical code for identifying each animal in a herd.

14 Claims, 1 Drawing Sheet

(56) References Cited

U.S. PATENT DOCUMENTS

| | | | |
|---|---|---|---|
| 2011/0030875 A1* | 2/2011 | Conte | G01V 15/00 156/64 |
| 2011/0174873 A1* | 7/2011 | Mori | A01G 9/143 235/375 |
| 2012/0256732 A1* | 10/2012 | McAllister | B65C 9/1865 340/10.2 |
| 2014/0104039 A1* | 4/2014 | Wilfred | G06K 19/06056 340/10.1 |
| 2018/0107914 A1* | 4/2018 | Ziola | G06Q 10/087 |
| 2018/0160649 A1* | 6/2018 | Hicks | A01K 11/00 |
| 2019/0012632 A1* | 1/2019 | Favier | G06K 19/07758 |

* cited by examiner

SYSTEM AND METHOD FOR INTEGRATING A TRACKING SYSTEM INTO A CATTLE MANAGEMENT SYSTEM

BACKGROUND OF THE INVENTION

The present invention relates to a system and method for integrating a tracking system into a cattle management system applied in the area of livestock farming used for cattle rearing, particularly for large herds reared on extensive territory properties.

Animal management systems are efficient methods to monitor existing breedings in a country. Keeping records on herd rearing conditions and performance is an important management tool and can be used to increase efficiency in farming. The individual identification of each animal in a herd is of paramount importance for any information recording system.

Usually, in the identification of animals, codes defined by a combination of letters, numbers or both are used. The codes are individual and aim to guarantee a unique identification for each animal, making it possible to differentiate it from the other animals of the herd. The most common identification methods for cattle are: earring (visual or electronic), tattooing, intraruminal bolus and fire marking.

In Brazil, the Ministry of Agriculture, Livestock and Supply (MAPA) provides a national identification and tracking system, called SisBov refers to the Brazilian Traceability Service of the Bovine and Bubaline Production Chain and aims to register and identify the bovine and buffalo herd of the national territory, making it possible to track the animal from birth to slaughter.

Currently, each new animal, when entering a farm, receives a SisBov identification kit that includes a large earring for visual identification and a small button type earring, which can be electronic or a simple piece of plastic. The button is intended to serve as redundancy for the visual earring in case of loss. Both the visual earring and the button earring comprise at least one printed numbering, referring to a unique numerical code for each animal.

The visual earrings are earrings that comprise bar codes engraved with a numeric or alphanumeric code, which can be read with the use of special readers that, through photoelectric sensors, interpret the code by means of the absence or presence of light reflected in the bars.

However, the use of visual earrings as animal husbandry tools is considered ineffective, since the accumulation of dirt on the earrings, the constant movement of the animals and the light conditions usually found in the confinement spaces of the animals, compromise the readability of the devices.

For this reason, in addition to the visual earrings, electronic earrings are used which contain inside them an electronic chip pre-programmed for electronic decoding. They are activated by receiving low frequency radio waves emitted by a reader. When passing near a reading antenna, the antenna signal activates the internal circuit of the chip that "responds" by emitting a radio signal.

Radio Frequency Identification (RAD) is an identification method that uses electromagnetic waves to transmit signals between an electronic device, known as a transponder, which, in this case, refers to the electronic earphone, and a reading device, referred to as a "transceiver", which refers to a reader or data collector. The reading device emits an electromagnetic signal, which activates the electronic earring, and it responds with another signal, containing its numerical code. The reader then identifies the received numeric code and passes this data to some type of record, where specific information must be stored concerning that numeric code.

However, there is a great difficulty found in the state of the art, due to the fact that the standardized electronic earrings that receive the numerical code of the SisBov are small, difficult to access for possible visual reading, and very short range for radio frequency reading at 900 MHz (Low Frequency), being necessary to position the data reader extremely close to the animal, less than 30 centimeters away, a factor that significantly hinders the handling of the devices and reading the earrings.

In addition, although the botton SisBov itself is marketed with this electronic mechanism, it ends up being discarded in the act of slaughter, since it does not allow rerecording. For this reason, the rural owner may decide to purchase a separate electronic botton, with the purpose of reusing the earring in another animal after slaughter, increasing its return on investment.

To circumvent the problems encountered in SisBov identification methods, some breeders use their own identification system comprising higher-tech earrings with superior technology compared to pre-programmed electronic earrings with the SisBov number, which achieve better reading distances, up to 10 meters.

However, the breeder, when inserting his own animal identification system, is forced to administer two distinct numerical codes for identification of the same animal, a first numerical code, generated by the breeder's own management system, and a second code number automatically generated by the tracking system, in this case SisBov, which cannot be changed. This management requires the use of additional software, with an external database, subject to inconsistencies.

SUMMARY OF THE INVENTION

The aim of the present invention is to provide a system and method for integrating a tracking system into a cattle management system capable of solving the difficulties encountered in the prior art through an integration between animal identification codes by associating a code numerically generated by the tracking system, particularly but not necessarily the SisBov, to a numerical code, generated by the breeder's own management system, by reading a single numerical code, in order to facilitate the identification of an animal in a herd.

The aim of the present invention is achieved by a system for integrating a tracking system into a cattle management system comprising a first reading device which sends information to a processing center, the processing center processing and sending the processed information to a recording device, the first reading device reading a numeric code recorded on a first earring and sending the information read to the processing center, the processing center receiving the information read by the reading device and processing and sending the information processed by the recording device, the recording device recording the numerical code processed by the processing center, the same numerical code being preferably read by the first reading device, in a third earring, the system for integration of a system tracking a cattle management system determining a unique numerical code to identify each animal in a herd.

The aim of the present invention is also achieved by a method for integrating a tracking system into a cattle management system characterized in that it comprises the following steps:

i) reading a numeric code recorded on a first earring using a reading device;
ii) sending the numerical code read by the reading device to a processing center;
iii) sending the numerical code processed by the processing center to a recording device;
iv) recording the numeric code processed in step iii) in a third earring using the recording device.

BRIEF DESCRIPTION OF THE DRAWINGS

It follows a more detailed description of the instant invention, based on one embodiment represented in the drawings. The figures show.

DETAILED DESCRIPTION

Figure 1:
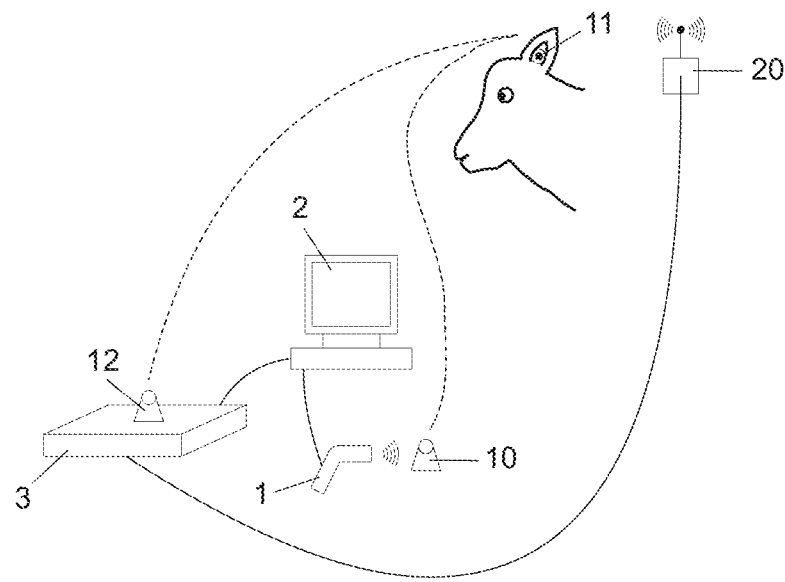
FIG. 1—schematic representation of the system for integrating the present invention into a first preferred configuration.
Figure 2:
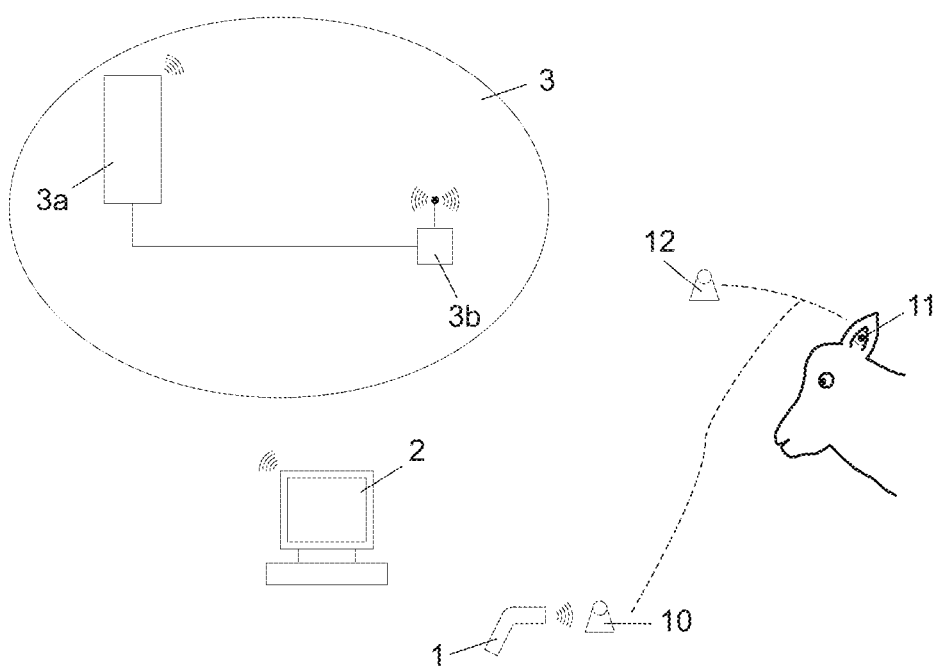
FIG. 2—schematic representation of the system for integrating the present invention into a second preferred configuration.

The present invention relates to a system for integrating a tracking system, specifically the SisBov tracking system, into a cattle management system, particularly configured for the management of beef cattle.

Each new animal, upon arriving at the farm, receives a visual earring and a botton type earring, which comprise a standardized numerical code provided with a tracking system, and an electronic earring containing a numeric code provided with a proprietary management system livestock breeder, each animal thus receiving three identifying accessories, one being a visual 10 earring, one 11 botton earring and one electronic earring 12.

The visual earring 10 and the earring botton 11, standardized by the tracking system, are commonly used for large herds, and placed on the animal regardless of whether the animal receives another identification accessory. However, as explained earlier, the visual 10 and botton 11 earrings, available in the SisBov standard, do not provide an effective alternative for reading their associated numeric code, making it significantly difficult to manipulate the devices and to read, either by bar code or by radio frequency.

For this reason, the cattle breeder uses a third accessory for animal identification, in the form of an electronic earring 12, with superior technology that allows reading at greater distances compared to the botton earring 11 used in the SisBov standard. In order to facilitate the understanding of the invention, it is to be understood that each animal receives, upon reaching the property, a first earring 10 which refers to the standard SisBov visual earring, a second earring 11 which refers to the botton earring, whether electronic or not, standard SisBov and a third earring 12 that refers to the electronic earring itself of the property management system and which comprises superior technology for reading over longer distances.

In comparative terms, the standard SisBov botton earring 11, when purchased in its electronic version, has a maximum laboratory reach of 1.5 meters, communicating with a low-frequency radio signal (LF—Low Frequency). In contrast, the electronic earring 12, which is part of the breeder's management system, has a reading range of up to 10 meters, communicating through ultra-high frequency (UHF) signals.

In addition to the longer reading range, the technology used in the electronic earrings 12 allows the reading of multiple earrings, unassisted (automatic) reading and very low cost by gain of scale.

The first, second and third earrings 10, 11, 12 comprise engraved numerical codes, so that the numerical code of the first and second earrings 10, 11 are identical, while the numerical code of the third earring 12 is distinct from the others. Therefore, even if the third earring 12 allows reading at greater distances, it would not be possible to read the numeric code referring to SisBov, since the SisBov and internal management system numbers are different.

The system for integrating the present invention comprises a first reading device 1 which reads a bar code printed on the first earring 10 for acquisition of the numerical code SisBov. The read device 1 is associated with a processing center 2 which communicates asynchronously with a server, where the rural property database is located. The processing center 2 and the server are connected through a conventional data network, be it local area network, Ethernet, Wi-Fi.

Asynchronous communication becomes important due to the intermittent availability of the network, either due to power outages, connection failures or any other reasons, unfortunately, very common in rural establishments. This type of communication allows the data generated by the processing center 2 to reach the server even in cases of interruption of the network communication. The robustness of this communication can be further enhanced by adding a receive acknowledgment mechanism that ensures that the data arrives intact and ordered to the server.

Preferably, but not necessarily, the first reading device 1 comprises a bar code reader gun or another bar code reader device, capable of reading and sending information read from the first earring 10 to the processing center 2.

Likewise, not necessarily, the first reading device 1 comprises a reader mechanism, such as a LF (Low Frequency) RFID reading stick, capable of reading and sending the read information of the second earring 11, when configured by an earring electronic botton standard SisBov, for central processing 2.

On the other hand, the processing center 2 is associated with a recording device 3 which records the numeric code SisBov, or a processed part of this numerical code, on the third earring 12, so that the first, second and third earrings 10, 11, 12 comprise identical numerical codes recorded, in this case the standardized numerical code SisBov.

In a first preferred embodiment, shown in FIG. 1, the system for integrating the present invention comprises reading device 1 communicating with the processing center 2, the processing center 2 communicating with the recording device 3, the communication of these components 1, 2, 3 being made by wired connections, by means of electrical connections, be of the USB type or other types of commonly used connections.

In the first preferred embodiment, the recording device 3 comprises a microprocessor base and a short-range radio-frequency identification antenna embedded in the base.

In a second preferred embodiment, shown in FIG. 1, the system for integrating the present invention comprises reading device 1 communicating with the processing center 2, the processing center 2 communicating with the recording device 3, the communication of these components 1, 2, 3 being made by wireless connection.

In the second preferred embodiment, the recording device 3 comprises a signal generator 3a with an electrical interface and an external recording antenna 3b.

The three earrings 10, 11, 12 are placed in a single animal, the first earring 10 being made available only for visual inspection and reading by bar code, the second earring 11 being made available for redundancy, whether for radio frequency reading, but very low reach, or just for visual conferencing, and the third earring 12 being effectively used for longer-range radio-reading. In practice, the first and second earrings 10, 11 are not used, as they provide ineffective reading identification means. However, even if they are not used in practice for the control of inventory within the property, the first and second earrings 10, 11 must necessarily be placed on the animal, as it is a compulsory requirement of SisBov. It should be noted, however, that the second earring 11, when electronic, comprises very short reading range, about 1.5 meters in laboratory conditions, when compared to the third earring 12 which enables radio frequency reading over longer distances, in the order of 10 meters.

The third earring 12 contains an apparent numerical code, printed on the material of the earring, and a numerical code of reading, which refers to the numerical code provided by SisBov.

In a practical example, there are the first and second earrings 10, 11 containing a numerical code "123456" and the third earring 12 containing a numeric code "987654". The reading device 1 reads the bar code of the first earring 10 and registers the numerical code "123456" in the processing center 2. The processing station 2 transmits this information to the recording device 3 which records the numeric code "123456" in the third earring 12. The third earring 12 contains the apparent numeric code "987654", printed on the earring material, however, when reading by radio frequency the third earring 12, the numerical code read is "123456", identical to the numeric code provided by SisBov and recorded on the first and second earrings 10, 11.

In a first constructive configuration, the original numerical code, printed on the third earring 12, is discarded and no longer used for identification purposes. In an alternative configuration, the original numerical code of the third earring 12 is not discarded, being correlated with the numeric code SisBov, so that the system database records the information of a single animal, both in the SisBov numeric code and in the original numerical code of the third earring 12.

In another alternative configuration, a combination, between numerical code printed on the third earring 12 and the numerical code standardized by SisBov, is engraved on the third earring 12. One possible logic is to discard the first three digits of the numeric code standardized by SisBov, as they are identical throughout the Brazilian national territory, and add the last four digits of the numerical code printed on the third earring 12, since they are the easiest digits to be identified visually.

In addition, the system for integration 1 of the present invention comprises a second radio frequency reading device 20, which is capable of reading the numerical code registered in the third earring 12 and identifying a particular animal to track its information and indicate actions to be taken with respect to that specific animal. The second reading device 20 is associated with the recording device 3, which in turn is associated with the processing center 2, which accesses the database relating to the numerical code read by the second reading device 20.

The second reading device 20 comprises a radio frequency reader gun having a low range antenna or a medium range reading antenna with high accuracy for animal identification or another suitable device for reading an electronic earring.

The method for integrating a tracking system, particularly the SisBov system, into a cattle management system of the present invention comprises the steps of:
  i) reading the numeric code recorded on the first earring 10 using the reading device 1;
  ii) sending the numerical code read by the reading device to the processing center 2;
  iii) sending the numerical code processed by the processing center 2 to the recording device;
  iv) recording the numeric code processed in step iii) in a third earring 12 using the recording device 3.

Although one preferred embodiment has been described, it must be understood that the scope of the instant invention covers other possible variations and that it is limited only by the content of the claims, the possible equivalents being included therein.

The invention claimed is:

1. A system for integrating a tracking system into a cattle management system comprising a first reading device (1) which sends information to a processing center (2), the processing center (2) processing the information and sending the processed information to a recording device (3), the first reading device (1) reading a first numeric code recorded on a first earring (10) and sending the first numeric code read by the first reading device (1) to the processing center (2), the processing center (2) receiving the first numeric code read by the first reading device (1) and processing and sending the processed first numeric code read by the first reading device (1) to the recording device (3), the recording device (3) recording the first numeric code processed by the processing center (2) in a third earring (12), the first numeric code being readable by the first reading device in the third earring (12), the system comprising a second reading device (20) which sends information read from the third earring to the recording device (3) which, in turn, sends the information to the processing station (2), the system for integrating a tracking system into a cattle management system and for determining a unique numerical code for identifying each animal in a herd.

2. The system for integrating a tracking system into a cattle management system according to claim 1, characterized in that the tracking system corresponds to SisBov.

3. The system for integrating a tracking system into a cattle management system according to claim 1, characterized in that the cattle management system is configured to manage a herd of beef cattle.

4. The system for integrating a tracking system into a cattle management system according to claim 1, characterized in that the processed first numeric code processed by the processing center (2) is identical to the first numeric code read by the first reading device (1).

5. The system for integrating a tracking system into a cattle management system according to claim 1, characterized in that the first reading device (1) is a bar code reader device.

6. The system for integrating a tracking system into a cattle management system according to claim 1, characterized in that the processing center (2) communicates asynchronously with a server that contains a database of the cattle management system.

7. The system for integrating a tracking system into a cattle management system according to claim 1, characterized in that the first reading device (1) communicates with the processing center (2) and the processing center (2) communicates with the recording device (3) each by wired connections.

8. The system for integrating a tracking system into a cattle management system according to claim 1, characterized in that the first reading device (1) communicates with the processing center (2) and the processing center (2) communicates with the recording device (3) each by wireless connections.

9. The system for integrating a tracking system into a cattle management system according to claim 7, characterized in that the recording device (3) comprises a microprocessor base and a short-range radio-frequency identification antenna embedded in the base.

10. The system for integrating a tracking system into a cattle management system according to claim 8, characterized in that the recording device (3) comprises a signal generator (3a) with an electrical interface and an external recording antenna (3b).

11. The system for integrating a tracking system into a cattle management system according to claim 1, characterized in that the first earring (10) is a bar code visual earring and the third earring (12) is an electronic earring.

12. The system for integrating a tracking system into a cattle management system according to claim 1, characterized in that the second reading device (20) is a radio frequency reading gun provided with a short-range antenna.

13. The system for integrating a tracking system into a cattle management system according to claim 1, characterized in that the second reading device (20) is a medium-range reader antenna with high precision for animal identification.

14. A method for integrating a tracking system into a cattle management system, the method comprising the following steps:
   i) reading a numeric code recorded on a first earring using a first reading device (1);
   ii) reading information recorded on a third earring using a second reading device (20)
   iii) sending the numeric code read by the first reading device (1) and the information read using the second reading device (20) to a processing center (2);
   iv) sending a processed numeric code processed by the processing center (2) to a recording device (3); and
   v) recording the processed numeric code processed in step iv) in the third earring (12) using the recording device (3).

* * * * *